United States Patent
Jiang et al.

(10) Patent No.: US 7,186,785 B2
(45) Date of Patent: Mar. 6, 2007

(54) PROCESS FOR MANUFACTURING VINYL-RICH POLYBUTADIENE RUBBER

(75) Inventors: Liansheng Jiang, Changchun (CN); Xuequan Zhang, Changchun (CN)

(73) Assignee: Changchun Institute of Applied Chemistry Chinese Academy of Science, Changchun (CN)

( * ) Notice: Subject to any disclaimer, the term of this patent is extended or adjusted under 35 U.S.C. 154(b) by 0 days.

(21) Appl. No.: 10/900,063

(22) Filed: Jul. 27, 2004

(65) Prior Publication Data

US 2005/0038209 A1  Feb. 17, 2005

(51) Int. Cl.
*C08F 4/80* (2006.01)
*C08F 136/06* (2006.01)

(52) U.S. Cl. .................. 526/139; 526/169.1; 526/335; 526/907

(58) Field of Classification Search ................ 526/139, 526/335, 169.1, 907
See application file for complete search history.

(56) References Cited

U.S. PATENT DOCUMENTS 3,419,505 A * 12/1968 Marsico ...................... 528/393
6,211,313 B1 * 4/2001 Luo ........................... 526/139
6,399,732 B2 * 6/2002 Luo ........................... 526/335
6,720,397 B2 * 4/2004 Luo ......................... 526/169.1

OTHER PUBLICATIONS

NIST Chemistry WebBook, Standard Reference Database No. 69, Jun. 2005, entry for Phosphonic Acid, diethyl ester.*
Rubber Technology, 3d ed. (M. Morton ed.), Van Nostrand Reinhold, NY, 1987, pp. 235, 241.*

* cited by examiner

*Primary Examiner*—Fred Teskin
(74) *Attorney, Agent, or Firm*—Knobbe, Martens, Olson & Bear LLP

(57) ABSTRACT

This invention relates to A process for manufacturing a vinyl-rich polybutadiene rubber, comprising polymerizing butadiene in a solvent using a catalyst system comprising an iron-based catalyst as catalyst and a phosphite as ligand, said catalyst system comprising: (A) an organoiron compound; (B) an organoaluminum compound; and (C) a phosphite selected from a group consisting of dialkyl phosphite, trialkyl phosphite, diaryl phosphite, triaryl phosphite and mixtures thereof; wherein, the mole ratio of component B to component A is 5:100; and that of component C to component A is 0.5:10; and 80 wt % of macromolecules of the rubber have a vinyl group.

9 Claims, 1 Drawing Sheet

PROCESS FOR MANUFACTURING VINYL-RICH POLYBUTADIENE RUBBER

FIELD OF THE INVENTION

This invention relates to a process for manufacturing vinyl-rich polybutadiene rubber.

BACKGROUND OF THE INVENTION

In the 1970s–1980s, medium- and high-vinyl-content polybutadiene (Intolene-50, 80 and Nipol BR1240, Nipol BR1245) have been developed and produced with alkyl lithium catalyst firstly by International Synthetic Rubber Co., Ltd, England and Japanese Geon Co., Japan respectively. Said kind of rubber features in low heat-generating, good wet-skid resistance, low resistance to rolling, good compatibility with natural rubber, etc. A Co series catalyst was developed by Japanese Synthetic Rubber Co. and was used to produce a syndiotactic 1,2-polybutadiene thermoplastic elastomer with low crystallinity in the year of 1974. There were many research reports on Mo, Ti, Cr, Fe-based complex catalyst. Simultaneously, the research including pilot scale experiments for synthesizing vinyl polybutadiene rubber by Li, Mo and Fe-based catalyst and the applied research on trial product had been carried out in China, but so far the vinyl polybutadiene rubber has not been manufactured commercially in China yet.

The advantages of organolithium catalyst system for manufacturing vinyl polybutadiene are as follows: on the one hand, said catalyst system is capable of controlling, effectively and over a wide range, the process structure (microstructure, continuous structure (block, randomness), geometric structure (linear, branched, star-shaped), long-range structure (molecular weight); on the other hand, said catalyst system is capable of manufacturing a variety of branded goods by changing the additive and solvent in a set of equipments. Although the Li catalyst can be used to produce polybutadiene rubbers having different vinyl contents, the Li catalyst is in need of polar solvents, for example, ethers, amines and sulfides, more specifically, such as tetrahydrofuran, diethylene glycol dimethyl ether, tetramethylethylenediamine and the like. Consequently, the synthetic cost is increased and the polymeric system-purifying and solvent-refining become more difficult. Meanwhile, since the vinyl content is inversely proportional to the polymerization temperature, i.e. the vinyl content decreases with the increase of temperature in the presence of the polar solvent. A lower polymerization temperature is harmful to energy-saving, especially to long chain-branching and molecular weight distribution (hereinafter referred to as MWD)-broadening. In order to obtain a definite degree of branching, a coupling reaction is often carried out by adding a multifunctional compound such as titanium tetrachloride, diesters and the like. By pulsafeeding the catalyst in batches, the MWD of the polymer is broadened and the processability is improved. By the Mo catalyst, taking aliphatic hydrocarbon as solvent, high 1,2-polybutadiene can be easily produced. The absence of a suitable MW regulator may be the reason for being unable to be put into commercial production. By the Fe catalyst, taking phenanthroline as ligand, 1,2-/cis-1,4-binary polybutadiene rubber having good physicomechanical properties and high wet-skid resistance is mainly obtained. However, it is difficult for the Fe catalyst to be used in the commercial production due to the following disadvantages: the ligand is too expensive and cannot be dissolved in an aliphatic solvent; when the polymerization temperature is higher than 30° C., the content of 1,2-structure decreases and the content of cis-1,4-structure increases (Bullets of Polymer (5), 389 (1984); CN 85 1 01897B).

SUMMARY OF THE INVENTION

The invention and the preferred embodiments described herein provide a process for manufacturing a vinyl-rich polybutadiene rubber.

In one embodiment, the following aspects are provided:

1. a process for manufacturing a vinyl-rich polybutadiene rubber, comprising polymerizing butadiene in a solvent using a catalyst system comprising an iron-based catalyst as catalyst and a phosphite as ligand, said catalyst system is comprised of:

A) an organoiron compound;
B) an organoaluminum compound; and
C) a phosphite selected from a group consisting of dialkyl phosphite, trialkyl phosphite, diaryl phosphite, triaryl phosphite and mixtures thereof;

wherein, the mole ratio of component B to component A is 5–100 ; and that of component C to component A is 0.5–10; and 80 wt % of macromolecules of the rubber have a vinyl group, a polybutadiene having a high content of 1,2-chain structure can by obtained using the iron series catalyst and an aliphatics-soluble and commercially available phosphite ester as a ligand.

2. The process according to 1, wherein the alkyl group in the dialkyl phosphite or the trialkyl phosphite is a linear or branched alkyl having 1–20 carbon atoms.

3. The process according to 1, wherein the aryl group in the diaryl phosphite or the triaryl phosphite is an aromatic group having 6–20 carbon atoms.

4. The process according to 1, wherein the organoiron compound is selected from a group consisting of carboxylate of $Fe^{2+}$, carboxylate of $Fe^{3+}$, complex of $Fe^{2+}$ and complex of $Fe^{3+}$.

5. The process according to 4, wherein the organoiron compound is selected from a group consisting of iron acetyl acetone, iron naphthenate, iron neodecanoate and iron i-octanoate.

6. The process according to 1, wherein the organoaluminum compound is selected from a group consisting of trialkylaluminum, dialkylaluminum hydride and dialkylaluminum chloride.

7. The process according to 6, wherein the alkyl group in the organoaluminum compound is selected from a group consisting of methyl, ethyl or isobutyl.

8. The process according to 1, the addition sequence of the catalyst components is selected from the group consisting of the following orders:

(a) first A, then B, then C;
(b) first A, then C, then B; and
(c) first A, then B or C, then aged first in the presence of butadiene, then the third component (the other of B or C) is added singly, wherein the mole ratio of butadiene to component A is 5:100.

9. The process according to 8, wherein, the catalyst components are added in the order (c).

10. The process according to 9, wherein, during the premixing of A and B or C, the component A is first added, and then butadiene.

11. The process according to 1, wherein the polymerization is carried out in a $C_6$–$C_9$ aliphatic hydrocarbon as a solvent, at 10–150° C.

12. The process according to 11, wherein said aliphatic hydrocarbon solvent is a $C_6$–$C_7$ mixed aliphatic hydrocarbon or hexane.

13. The process according to 11, wherein said polymerization temperature is 50–90° C.

14. The process according to 1, wherein the mole ratio of component B to component A is 5–15, that of component C to component A is 2–6.

DETAILED DESCRIPTION OF THE PREFERRED EMBODIMENT

Figure 1:
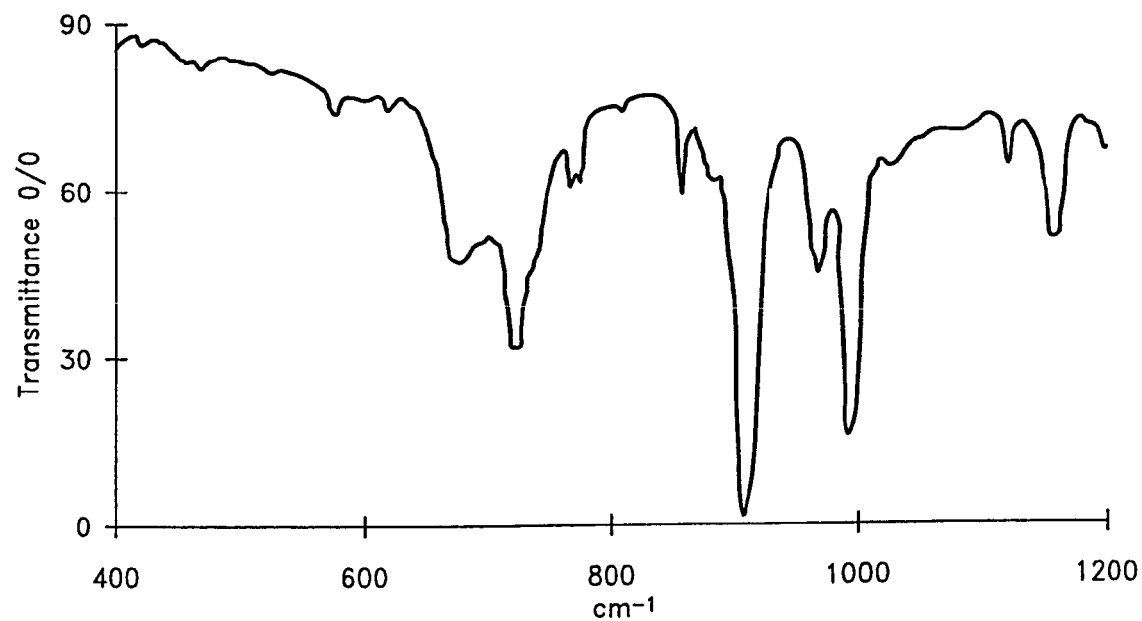
FIG. 1 shows an IR spectrum of the polybutadiene rubber obtained in example 1.

Herein, "X+Y" means that X is first added, then Y is added.

The composition of the catalyst system in accordance with preferred embodiments of this invention is illustrated as follows:

An organoiron compound, preferably ferrous and ferric carboxylate and complex, most preferably iron acetyl-acetone, iron naphthenate, iron neodecanoate or iron isooctanoate;

An organoaluminum compound, preferably trialkyl aluminum, dialkyl aluminum hydride, or dialkyl aluminum chloride, most preferably Al(i-Bu)$_3$, AlEt$_3$, Al(i-Bu)$_2$H, or mixture of any two;

A phosphite, preferably dialkyl phosphite compound.

The components of this catalyst system can be added in any order or in a premixed maturing way into the system of butadiene-solvent to initiate the polymerization, preferably in A+B+C or A+C+B order. Alternatively, two components or three components can be mixed and aged, preferably in the presence of a small amount of butadiene (Bd), and then are added to the system of butadiene-solvent to initiate the polymerization. The binary aged way in A+Bd+B→C and A+Bd+C→B, or the sequential addition of A+B+C and A+C+B are more preferred.

The mole ratios of the components of this catalyst system are as follows: the ratio of component B to component A is 5–100, preferably 5–20, most preferably 5–15; the ratio of component C to component A is 0.5–10, more preferably 2–6; the ratio of Bd (added, if any, during aging) to component A is 5–100.

The catalyst system of this invention can be used in the bulk polymerization of conjugated diene, or the solution or suspension polymerization in the presence of a hydrocarbon solvent, preferably an aliphatic hydrocarbon solvent and most preferably hexane. The polymerization temperature is 10–150° C., preferably 40–90° C. A polybutadiene rubber with an appropriate molecular weight and molecular weight distribution and a high vinyl content is obtained. The mass fraction of vinyl group can be 80% or more. The vinyl-rich polybutadiene is an excellent material for producing the tire for automobile and aircraft.

One feature of this invention is that, vinyl polybutadiene rubber can be produced in an existing process unit for Ni series cis-1,4-butadiene rubber with aliphatic hydrocarbon as solvent and tri(i-Bu) aluminum as cocatalyst, except that the main catalyst and the ligand shall be changed.

Another feature of this invention is that, if necessary, a syndiotactic high 1,2-polybutadiene with low crystallinity or a syndiotactic 1,2-polybutadiene with high crystallinity can be produced by changing the composition of the said catalyst and the process conditions.

In examples 8 and 9, the basic formula of polybutadiene rubber adopted for the vulcanized rubber is as follows (parts by weight): crude rubber 100, stearic acid 2, zinc oxide 4, antioxidant D 1, carbon black (HAF) 50, accelerator CZ 0.7, sulfur 1.5. The mixing temperature is 50° C. Vulcanizing conditions are as follows: 150° C.×30 min, a pressure of 10 MPa.

The microstructure of the rubber obtained is analyzed on a Digilab FTS-20 spectrometer; the molecular weight and molecular weight distribution of samples are determined on a PL-GPC 220 at 135° C. with o-chlorobenzone as solvent; tensile analysis is taken on an Instron 1211 electronic tester at a drawing speed of 50 mm/min; the intrinsic viscosity is measured in toluene at 30° C.; the melting point of sample was measure on a Perking-Elmer DSC-7 instrument at a scanning rate of 10° C./min.

The present invention can be more clearly understood from the following examples. The examples are merely for illustrating this invention, and are not intended to limit this invention.

EXAMPLE 1

Into a baked and dried single-neck 120 ml reacting flask, under the protection of nitrogen gas, 84 ml of dry hexane and 10 g of dry butadiene were sequentially added. After that, 0.09 ml (0.0124 mmol) of iron isooctanoate as the catalyst component A, 0.19 ml (0.19 mmol) of triisobutylaluminum as the catalyst component B and 0.59 ml (0.0295 mmol) of ethyl phosphite as the catalyst component C were added successively in above order (A+B+C). The flask was put into a water bath (50° C.) to polymerize for 4 hr, then an alcohol aqueous solution containing 2,6-di(t-butyl)-4-cresol was added to terminate the precipitation of rubber sample. After vacuum drying and weighing, the relevant data are determined and listed in Table 1.

A typical IR spectum is showed in FIG. 1, where 911 cm$^{-1}$ and 667 cm$^{-1}$ are characteristic peaks of 1,2-units of polybutadiene.

EXAMPLE 2

Except that the adding order of the catalyst components being the order of A, C and B (A+C+B), example 2 is carried out as in example 1. The result was listed in Table 1.

EXAMPLE 3

Into a dried single-neck 10 ml ampoule, 0.35 ml (0.0483 mmol) of iron isooctanoate, 0.59 ml of a butadiene-hexane solution (containing 1.09 mmol of butadiene), 0.76 ml (0.76 mmol) of triisobutylaluminum were added successively in above order (A+Bd+B). After mixing, 0.59 ml (0.0295 mmol) of diethyl phosphite was added. The ampoule was put into a water bath (50° C.) and then the polymerization is carried out. The rest was the same as those in example 1. The results were listed in Table 1.

EXAMPLE 4

Example 4 is carried out in the same way as in example 3, except that the aging order of the catalyst being A, Bd and C (A+Bd+C), the addition amounts of diethyl phosphite, the aged catalyst, and triisobutylaluminum being 2.36 ml (0.118 mmol), 0.83 ml, (0.19 mmol) respectively. The test results were listed in Table 1.

TABLE 1

The activities of the Fe series catalysts and the structures of the obtained polymers

| Example No. | Conversion rate (%) | [η] (dL/g) | Gel (%) | 1,2-chain segment (%) | Trans-1,4-chain segment (%) | Tg (° C.) |
|---|---|---|---|---|---|---|
| 1 | 95 | 6.54 | 1.4 | 88.4 | 11.6 | — |
| 2 | 98 | — | — | 86.4 | 13.6 | −38 |
| 3 | 95 | 8.0 | 5.0 | 83.8 | 16.2 | — |
| 4 | 99 | — | — | — | — | −23 |

EXAMPLE 5

Into a dried single-neck 120 ml reacting flask, under the protection of nitrogen gas, 84 ml of dry hexane and 10 g of dry butadiene were successively added. After that, 0.1 ml (0.015 mmol) of iron i-octanoate as the component A, 1.2 ml (0.06 mmol) of diethyl phosphite as the component C, and 0.56 ml (0.224 mmol) of triethylaluminum as the component B were added successively in above order (A+C+B). After mixing, the flask was put into a water bath (50° C.) to polymerize for 4 hrs. The rubber sample was precipitated by adding alcohol aqueous solution containing 2,6-di(t-butyl)-4-cresol. After vacuum drying, 7.5 g of dry rubber was obtained. Inherent viscosity [η] of the rubber was 3.85 dL/g. Upon infrared spectroscopic analysis, the content of 1,2-chain segment structure was 90.8%, and that of trans-1,4-chain segment structure was 9.2%.

EXAMPLE 6

Into a dried single-neck 120 ml reacting flask, under the protection of nitrogen gas, 84 ml of dry hexane and 10 g of dry butadiene were successively added. After that, 0.1 ml (0.015 mmol) of iron isooctanoate as the component A, 1.18 ml (0.059 mmol) of dimethyl phosphite as the component C, and 0.22 ml (0.22 mmol) of triisobutylaluminum as the component B, was added successively in above order (A+C+B). After mixing, the flask was put into a water bath (50° C.) to polymerize for 4 hr. The rubber sample was precipitated by adding alcohol aqueous solution containing 2,6,4-antiaging agent. After vacuum drying, 9.5 g of dry rubber was obtained. Inherent viscosity [η]=4.32 dL/g. Upon infrared spectroscopic analysis, the content of 1,2-chain segment structure was 85.1%, and that of trans-1,4-chain segment structure was 14.9%.

EXAMPLE 7

Except that dimethyl phosphite was substituted by 1.18 ml (0.059 mmol) of dibutyl phosphite, example 7 is carried out in the same way as that in example 6. 5.5 g of dry rubber was obtained. Upon infrared spectroscopic analysis, the content of 1,2-chain segment structure was 87.6%, and that of trans-1,4-chain segment structure was 12.4%.

EXAMPLE 8

Into a dried 5 L stainless steel reactor equipped with mechanical stirring, 2600 ml of $C_6$–$C_7$ mixed aliphatic hydrocarbon first, 500 ml (−310 g) of butadiene then, were added. After heating to 50° C., 1.3 ml (0.572 mmol) of iron isooctanoate and 76.5 ml (5.74 mmol) of diethyl phosphite were added. After 10 min, 27.3 ml (8.6 mmol) of triisobutylaluminum was added. After reacting for 4 hr, the rubber sample was precipitated by putting the rubber solution in alcohol aqueous solution containing 2.6.4-antiaging agent. After air drying and vacuum drying, 261 g of dry rubber was obtained. Inherent viscosity [η]=5.71 dL/g, and mooney viscosity $ML_{1+4}$(100° C.)=77.5. Upon infrared spectroscopic analysis, the content of 1,2-chain segment structure was 83.2%, that of trans-1,4-chain segment structure was 16.8%. Good chemicals-absorbing behavior, not roll release, basically smooth and plane sheeting-off. The vulcanized rubber has a tensile strength of 16.7 Mpa, an elongation of 360%, a shore hardness of 70.

EXAMPLE 9

Into the same reactor as example 8, the same C6–C7 mixed aliphatic hydrocarbon and butadiene were added. By way of binary aging in the A+Bd+B order and singly adding the component C, 1.3 ml (0.572 mmol) of iron isooctanoate, 5.74 ml of butadiene solution, and 18.2 ml (5.73 mmol) of triisobutylaluminum were added and mixed. And then aged at room temperature for 10–15 min. After the aged matter was added into the reactor with stirring, and 30.6 ml (2.3 mmol) of diethyl phosphite was further added to polymerize for 4 hr at 50° C., and the maximum temperature rose up to 60° C. The rubber sample was precipitated from the rubber solution by adding alcohol aqueous solution containing 2.6.4-antiaging agent, and 300 g of dry rubber was obtained. Mooney viscosity $ML_{1+4}$(100° C.)=79. The processability of the mixed stock has improved by adding 20 parts of processing oil during mixing. For the vulcanized rubber: tensile strength 16.2 MPa, 300% stretching stress 11.5 MPa, elongation 407%, tearing strength 44.5 KN/m, permanent set 22.0, shore hardness 68, elasticity 10.6%.

EXAMPLE 10

Into a baked and dried single-neck 120 ml reacting flask, under the protection of nitrogen gas, 84 ml of dry hexane first, 10 g of dry butadiene then, were added. After that, 0.1 ml (0.015 mmol) of iron isooctanoate and 0.3 ml (0.015 mmol) of diethyl phosphite were added. After 5 min, 0.22 ml (0.22 mmol) of triisobutylaluminum was added. The flask was put into a water bath (50° C.) to polymerize for 4 hr. 9.8 g of powdered syndiotactic 1,2-polybutadiene was obtained by adding alcohol aqueous solution containing 2,6,4-antiaging agent. The melting temperature was determined as 176.9° C. by DSC method at a scanning rate of 10° C./min. By high temperature GPC with o-dichlorobenzene as solvent at a temperature of 135° C., the following results were obtained: $Mn=51\times10^4$, $Mw=125\times10^4$, $Mv=109\times10^4$, $Mw/Mn=2.4$.

EXAMPLE 11

Into a dried 5 L stainless steel reactor equipped with mechanical stirring, 2600 ml of $C_6$–$C_7$ mixed aliphatic hydrocarbon first, 500 ml (about 310 g) of butadiene then, were added. After heating to 50° C., 1.3 ml (0.572 mmol) of iron isooctanoate and 15.3 ml (1.01 mmol) of diethyl phosphite were added. After 10 min, 33 ml (10.4 mmol) of triisobutylaluminum was added. To polymerize for 4 hr, after heating to 63° C., 265 g (dry weight) of powdered polymer was precipitated by putting the polymer solution in an alcohol aqueous solution containing 2.6.4-antiaging agent. Upon infrared spectroscopic analysis, the content of 1,2-chain segment structure was 88.3%, that of trans-1,4-chain segment structure was 11.7%. Mn=52.9×10$^4$, Mw=128.2×10$^4$, Mv=113.3×10$^4$, Mw/Mn=2.4 (by high temperature GPC). The melting temperature was 175.9° C.(by DSC method).

What is claimed is:

1. A process for manufacturing a vinyl-rich polybutadiene rubber, comprising polymerizing butadiene in a solvent using a catalyst system comprising an iron-based catalyst as catalyst and a phosphite as ligand, said catalyst system comprising:

A) an organoiron compound;
B) an organoaluminum compound; and
C) a phosphite selected from a group consisting of dialkyl phosphite, trialkyl phosphite, diaryl phosphite, triaryl phosphite and mixtures thereof;

wherein, the mole ratio of component B to component A is between 5 and 100; and that of component C to component A is between 0.5 and 10; and 80 wt % or more monomer units of macromolecules of the rubber have a vinyl group, wherein the organoiron compound is selected from the group consisting of iron acetyl acetone, iron naphthenate, iron neodecanoate and iron-i-octanoate, wherein the addition sequence of the catalyst components is in the following order: first A, then B or C, then aged first in the presence of butadiene for 10 to 15 min, then the other B or C added singly, wherein the mole ratio of butadiene to component A is between 5 and 100, wherein during the premixing of A and B or C, the component A is first added, and then butadiene.

2. The process according to claim 1, wherein the alkyl group in the dialkyl phosphite or the trialkyl phosphite is a linear or branched alkyl having 1–20 carbon atoms.

3. The process according to claim 1, wherein the aryl group in the diaryl phosphite or the triaryl phosphite is an aromatic group having 6–20 carbon atoms.

4. The process according to claim 1, wherein the organoaluminum compound is selected from the group consisting of trialkylaluminum, dialkylaluminum hydride and dialkylaluminum chloride.

5. The process according to claim 4, wherein the alkyl group in the organoaluminum compound is selected from the group consisting of methyl, ethyl and isobutyl.

6. The process according to claim 1, wherein the polymerization is carried out in a $C_6$–$C_9$ aliphatic hydrocarbon as a solvent, at 10–150° C.

7. The process according to claim 6, wherein said aliphatic hydrocarbon solvent is a $C_6$–$C_7$ mixed aliphatic hydrocarbon or hexane.

8. The process according to claim 6, wherein said polymerization temperature is 50–90° C.

9. The process according to claim 1, wherein the mole ratio of component B to component A is between 5 and 15, that of component C to component A is between 2 and 6.

* * * * *